United States Patent [19]

Yomogida

[11] Patent Number: 4,833,309
[45] Date of Patent: May 23, 1989

[54] BAR-CODE READING APPARATUS

[75] Inventor: Matsuo Yomogida, Miyagi, Japan

[73] Assignee: Tohoku Ricoh Co., Ltd., Miyagi, Japan

[21] Appl. No.: 186,398

[22] Filed: Apr. 26, 1988

[30] Foreign Application Priority Data

Jun. 13, 1987 [JP] Japan .................................. 62-146201

[51] Int. Cl.[4] .............................................. G06H 7/10
[52] U.S. Cl. ...................................... 235/462; 235/474
[58] Field of Search .................................. 235/462, 474

[56] References Cited

U.S. PATENT DOCUMENTS 3,749,889 7/1973 Vaskunas ............................ 235/462

Primary Examiner—Harold I. Pitts
Attorney, Agent, or Firm—Burgess, Ryan & Wayne

[57] ABSTRACT

Disclosed is a bar-code reading apparatus including a peak hold circuit for converting an analog signal which is obtained by reading a bar code into a digital signal, wherein the peak hold circuit generates an original signal corresponding to the analog signal, a first comparison signal, the peak value of which is compared with the original signal to determine a changing point from black to white, and a second comparison signal, the peak value of which is compared with the original signal to determine a changing point from white to black, and the peak hold circuit independently shifts levels of the first and second comparison signals with respect to the original signal, thereby eliminating noise components which are included in the bar code.

1 Claim, 5 Drawing Sheets

BAR-CODE READING APPARATUS

BACKGROUND OF THE INVENTION

I. Field of the Invention

The present invention relates to a bar-code reading apparatus and, more particularly, to an apparatus which eliminates noise components included in a bar code and extracts correct data.

II. Description of the Prior Art

FIG. 3 is a block diagram showing a schematic arrangement of a conventional bar-code reading apparatus. Reference numeral 1 denotes a bar code; 2, a light source for illuminating the bar code; 3, a photoelectric transducer for receiving and photoelectrically converting light reflected by the bar code; 4, an amplifier for amplifying a photoelectrically converted signal and outputting an analog signal. Reference numeral 5 denotes a peak hold circuit for holding a peak value of the analog signal; 6, a comparator for comparing the held peak value with an original signal; 7, an output circuit for outputting a digital signal corresponding to the bar code in accordance with an output from the comparator; and 8, a light source driver.

FIG. 4 shows a detailed circuit arrangement of the peak hold circuit 5 and the comparator 6 in the conventional bar-code reading apparatus. An analog signal output from the amplifier 4 is voltage-divided by resistors $R_1$, $R_2$, and $R_3$, and signals a, b, and c are extracted. The signal b represents an original signal. As shown in FIG. 5(a), when peak values $d_1$ and $d_2$ of the signals a and c are held and these levels are simultaneously inverted with respect to the original signal b, an output level of the comparator 6 is changed from low to high or from high to low, thereby obtaining a signal corresponding to the bar code, as shown in FIG. 5(b). More specifically, the peak value $d_1$ of the signal a determines a changing point from black to white, and the peak value $d_2$ of the signal c determines a changing point from white to black. (Note that a level of an output from the output circuit 7 is opposite to that of the output from the comparator, and a block portion is set at high level.)

FIG. 6 shows another conventional arrangement of the peak hold circuit. In FIG. 6, a threshold value of the changing point from white to black or from black to white is set using a forward voltage drop Vf of a diode, as shown in FIG. 7.

However, with the above conventional arrangements, as shown in FIGS. 4 and 5, since the analog singal is voltage-divided by fixed resistors connected in series to extract the original signal and the comparison signal, a difference in the levels among the signals is constant by voltage-division resistors, and therefore the threshold value cannot be changed. This can be applied to FIGS. 6 and 7.

As shown in FIGS. 8(a), 8(b), and 8(c), however, assuming that a space portion (white) of the bar code is contaminated, that a bar portion (black) is printed by a dot printer, or that the black portion is partially omitted, bar-code data which can be actually read out includes a lot of noise. If a noise level exceeds the difference in the levels among the signals, the signal output from the output circuit is different from the desired signal which is represented by a dotted line.

SUMMARY OF THE INVENTION

It is a principal object of the present invention to provide a bar-code reading apparatus which can properly adjust a difference in levels between an original signal and a comparison signal in accordance with the state of the bar code and eliminate an influence of noise to obtain a desired output signal.

In order to achieve the above object, the peak hold circuit generates an original signal corresponding to an analog signal, a first comparison signal, a peak value of which is compared with the original signal to determine the changing point from black to white, and a second comparison signal, a peak value of which is compared with the original signal to determine the changing point from white to black. In addition, the levels of the first and second comparison signals can be separately shifted with respect to the original signal.

With the above arrangement, the difference in the levels between the original signal and the comparison signal can be properly adjusted. Therefore, when the space portion is contaminated or the bar portion is partially omitted in the bar code, the level difference is increased so that the level of the noise does not exceed the level between the signals, thereby eliminating the noise influence.

The above and other objects, the features, and advantages of the present invention will be apparent in the following detailed description of the embodiment in conjunction with the accompanying drawings.

DESCRIPTION OF THE PREFERRED EMBODIMENT

Figure 1:
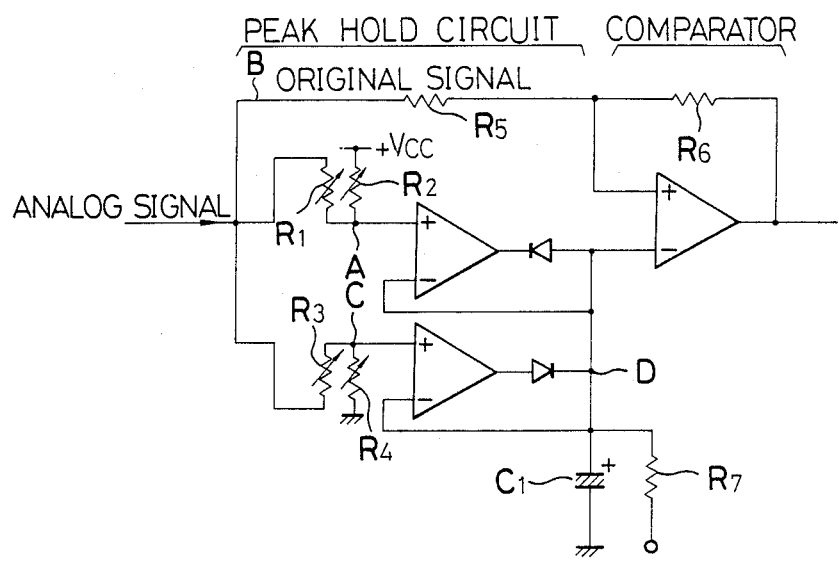
FIG. 1 is a circuit diagram showing a peak hold circuit according to an embodiment of the present invention.

FIG. 1 shows an embodiment of the present invention. In a peak hold circuit, an analog signal is supplied as an original signal B to a comparator. A signal A obtained by causing resistors $R_1$ and $R_2$ to voltage-divide a potential difference between power source voltage Vcc and the original signal B serves as a first comparison signal, a peak value of which is compared with the original signal to determine the changing point from black to white. A signal C obtained by causing resistors $R_3$ and $R_4$ to voltage-divide the potential difference between the original signal B and ground serves as a second comparison signal, the peak value of which is compared with the original signal to determine the changing point from white to black. In addition, the resistors $R_1$ and $R_2$, and $R_3$ and $R_4$ can be independently adjusted.

Figure 2:
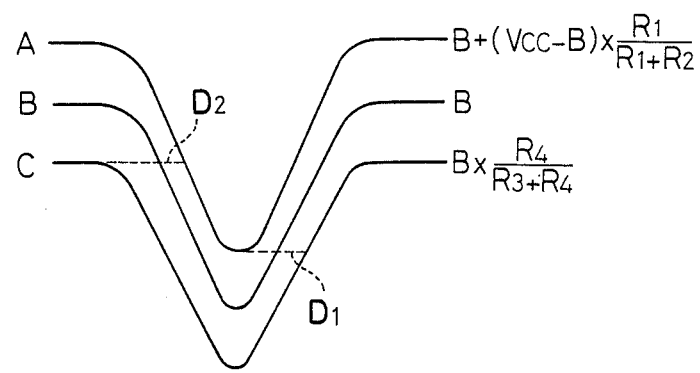
FIG. 2, A–C, is a chart showing waveforms of an original signal and first and second comparison signals which are generated by the circuit in FIG. 1.
Figure 3:
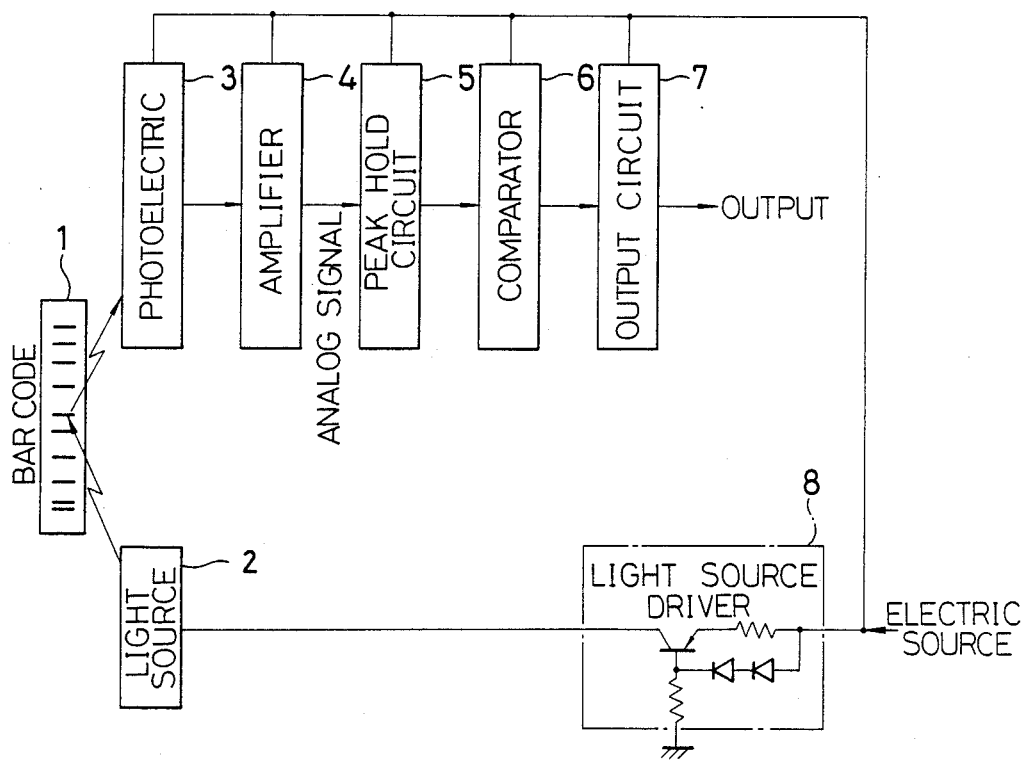
FIG. 3 is a block diagram showing an arrangement of a bar-code reading apparatus.
Figure 4:
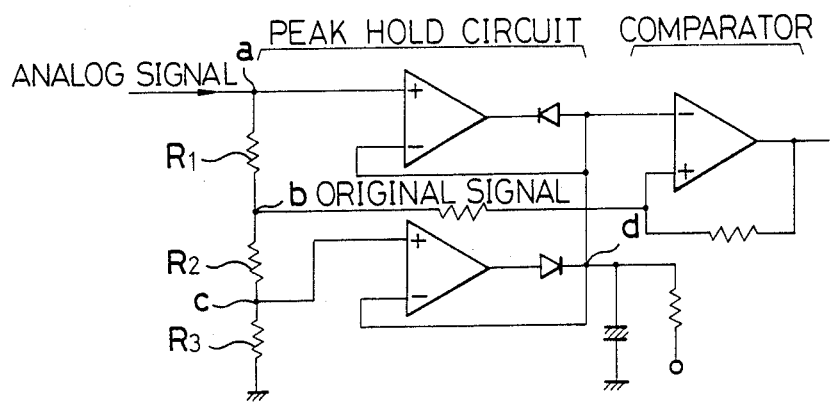
FIG. 4 is a circuit diagram of the conventional peak hold circuit.
Figure 5A:
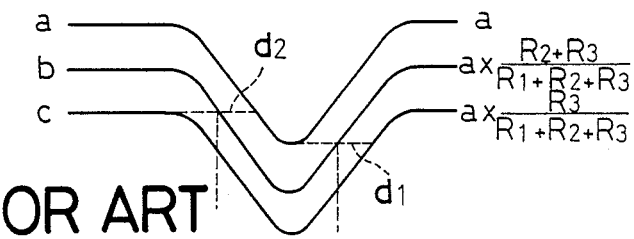
FIGS. 5(a) and 5(b) are charts showing waveforms of the original and comparison signals generated by the circuit in FIG. 4.
Figure 5B:
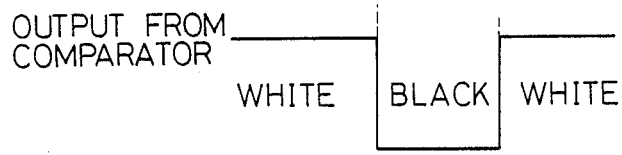
Figure 6:
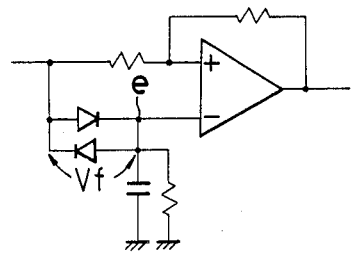
FIG. 6 is a circuit diagram of another conventional peak hold circuit.
Figure 7:
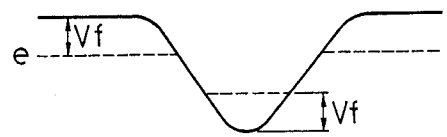
FIG. 7 is a chart of a signal waveform in FIG. 6.
Figure 8A:
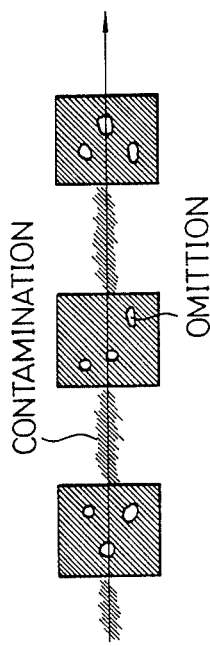
FIGS. 8(a), 8(b), and 8(c) are charts showing the analog signal and the output signal from an output circuit in the case that the space portion is contaminated, the bar portion is partially omitted, or the like in the bar code.
Figure 8B:
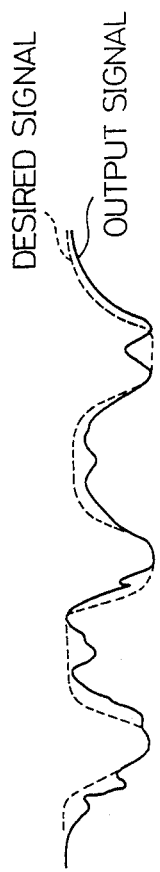
Figure 8C:
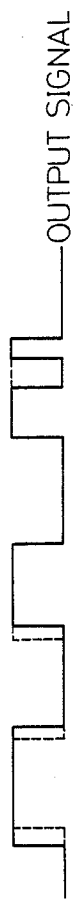

With the above arrangement, as shown in FIG. 2, when a peak value $D_1$ of the signal A is held and the original signal B exceeds the peak value of the signal A, an output from the comparator is changed from low level to high level. When the peak value $D_2$ of the signal C is held and the level of the peak value of the original signal B is lower than that of the signal C, the output from the comparator is changed from high level to low level. The peak values $D_1$ and $D_2$ are respectively determined by the resistors $R_1$ and $R_2$, and $R_3$ and $R_4$.

Assume that the space portion is contaminated and causes a variation in reflectivity in accordance with the state of the bar code, resistances of the resistors $R_3$ and $R_4$ are adjusted so that the difference in the level between the original signal B and the comparison signal C is large. In addition, assume that the bar code is printed by a dot printer or that the bar portion is partially omitted and causes a variation in reflectivity, resistance of the resistors $R_1$ and $R_2$ are adjusted so that the difference in the level between the original signal B and the comparison signal A is large. As described above, even if noise is generated due to contamination and partial omissions, a noise influence can be minimized by appropriate setting of the level among the signals.

As has been described above, according to the present invention, the level of the comparison signal is properly adjusted in accordance with the state of the bar code and a noise influence is excluded, thus extracting correct data of the bar code.

What is claimed is:

1. A bar-code reading apparatus comprising: an illuminating unit for illuminating a bar code; a photoelectric transducer for receiving and photoelectrically converting light reflected by said bar code; an amplifier for amplifying the photoelectrically converted signal; a peak holding circuit for holding a peak value of an analog signal which is amplified and output; a comparator for comparing a held peak value with an original signal; and an output circuit for outputting a digital signal corresponding to said bar code in accordance with an output from said comparator; wherein said peak hold circuit comprises means for generating the original signal corresponding to the analog signal, a first comparison signal, a peak value of which is compared with the original signal to determine a changing point from black to white, and a second comparison signal, a peak value of which is compared with the original signal to determine a changing point from white to black, and for independently shifting levels of the first and second comparison signals with respect to the original signal.

* * * * *